United States Patent [19]

Tokuyama

[11] Patent Number: 4,688,114

[45] Date of Patent: Aug. 18, 1987

[54] DRUM SERVO CIRCUIT

[75] Inventor: Yoshio Tokuyama, Yokohama, Japan

[73] Assignee: Victor Company of Japan, Ltd., Yokohama, Japan

[21] Appl. No.: 870,843

[22] Filed: Jun. 5, 1986

[30] Foreign Application Priority Data

Jun. 6, 1985 [JP] Japan .............................. 60-123217
Jun. 6, 1985 [JP] Japan .............................. 60-123218

[51] Int. Cl.[4] ............................................. G11B 21/04
[52] U.S. Cl. ............................................................ 360/70
[58] Field of Search .................................... 360/70, 73

[56] References Cited

U.S. PATENT DOCUMENTS 4,490,755 12/1984 Takuyama .............................. 360/70

Primary Examiner—George G. Stellar
Attorney, Agent, or Firm—Michael N. Meller

[57] ABSTRACT

A drum servo circuit for a magnetic recording and/or reproducing apparatus uses a 30 Hz or 60 Hz oscillator circuit (counter), and a trapezoidal wave signal (or a sampling pulse signal) is produced by selectively using threshold values set in the oscillator circuit depending on the play mode, so as to eliminate the need to externally couple a plurality of variable resistors to a monostable multivibrator. A drum motor which drives a rotary drum is controlled responsive to a phase error signal which is obtained by comparing the phase of the trapezoidal wave signal (or the sampling pulse signal) and the phase of a rotation detection signal which is obtained by detecting the rotation of the drum motor.

9 Claims, 12 Drawing Figures

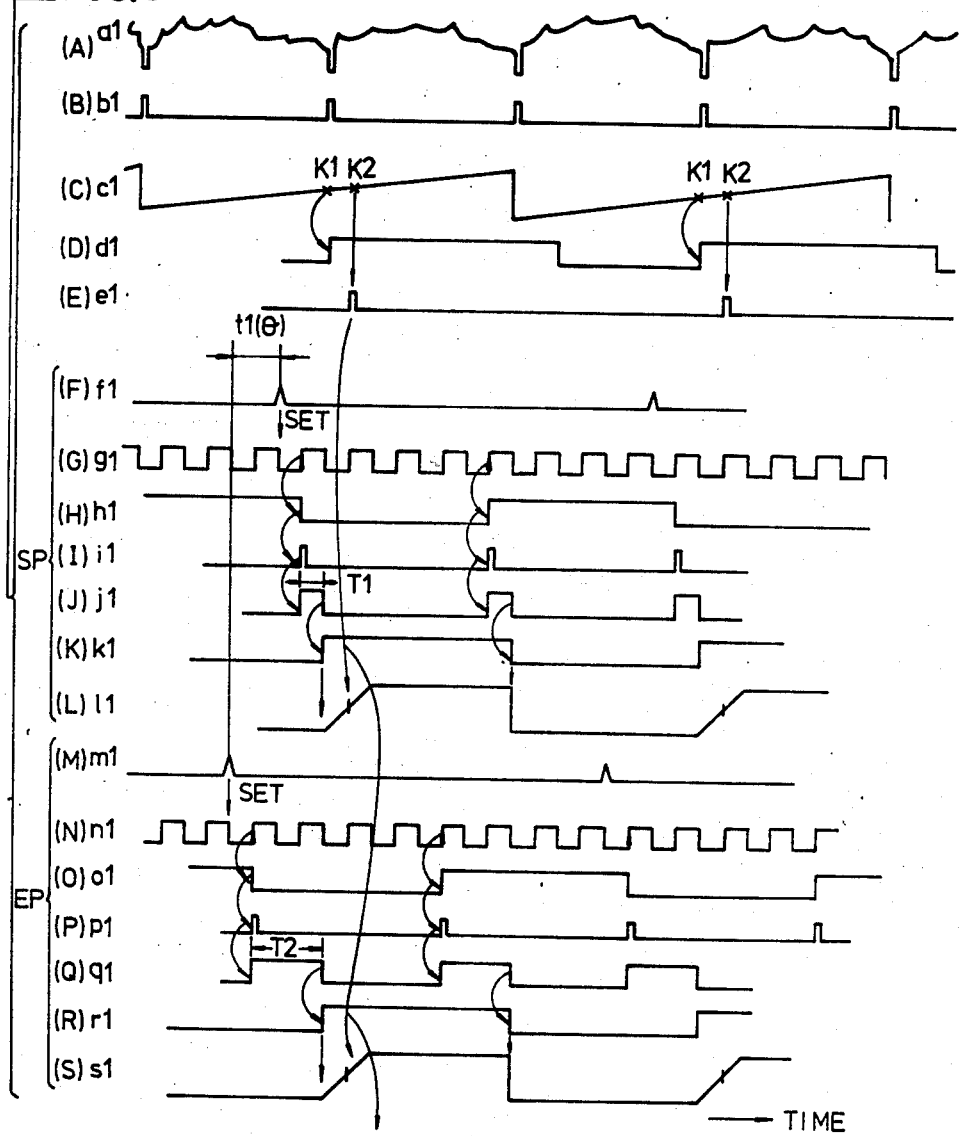

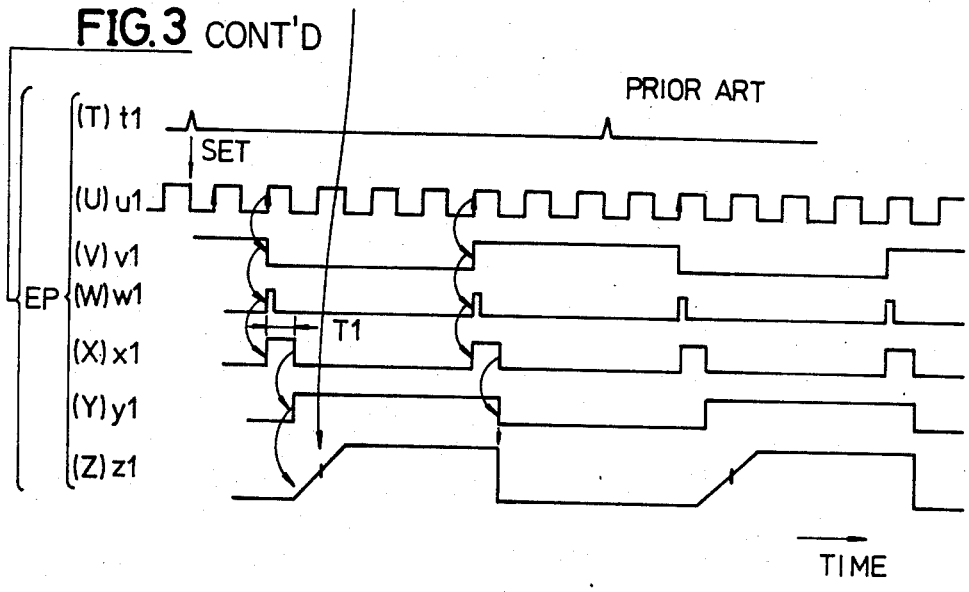

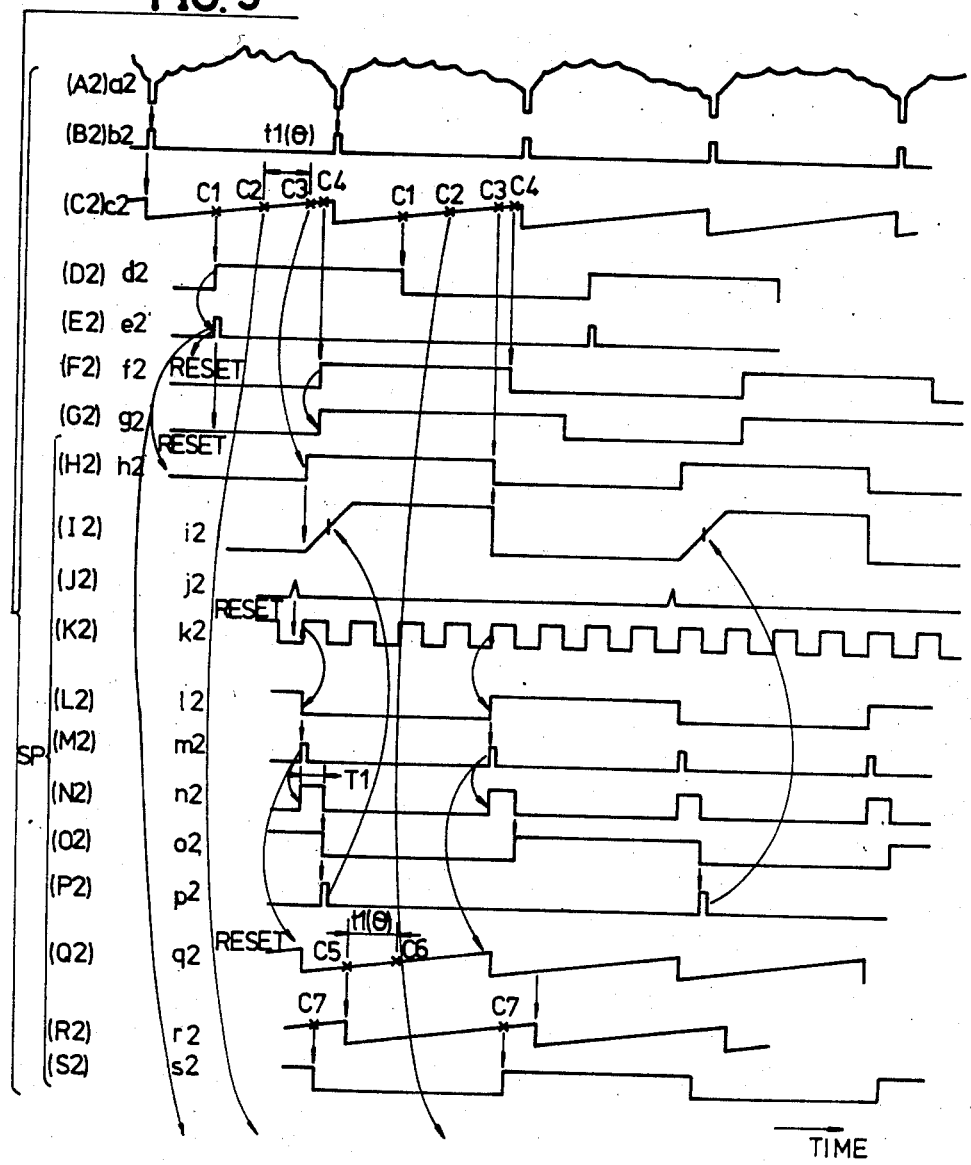

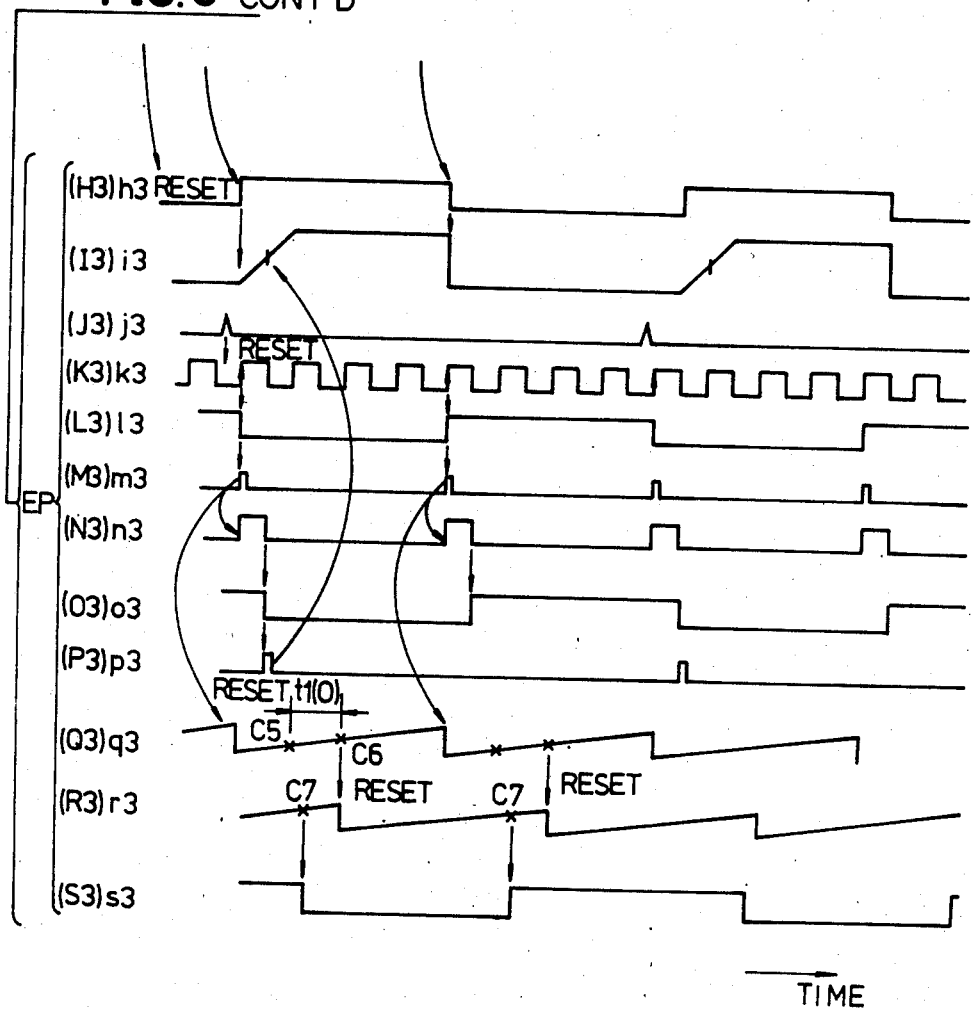

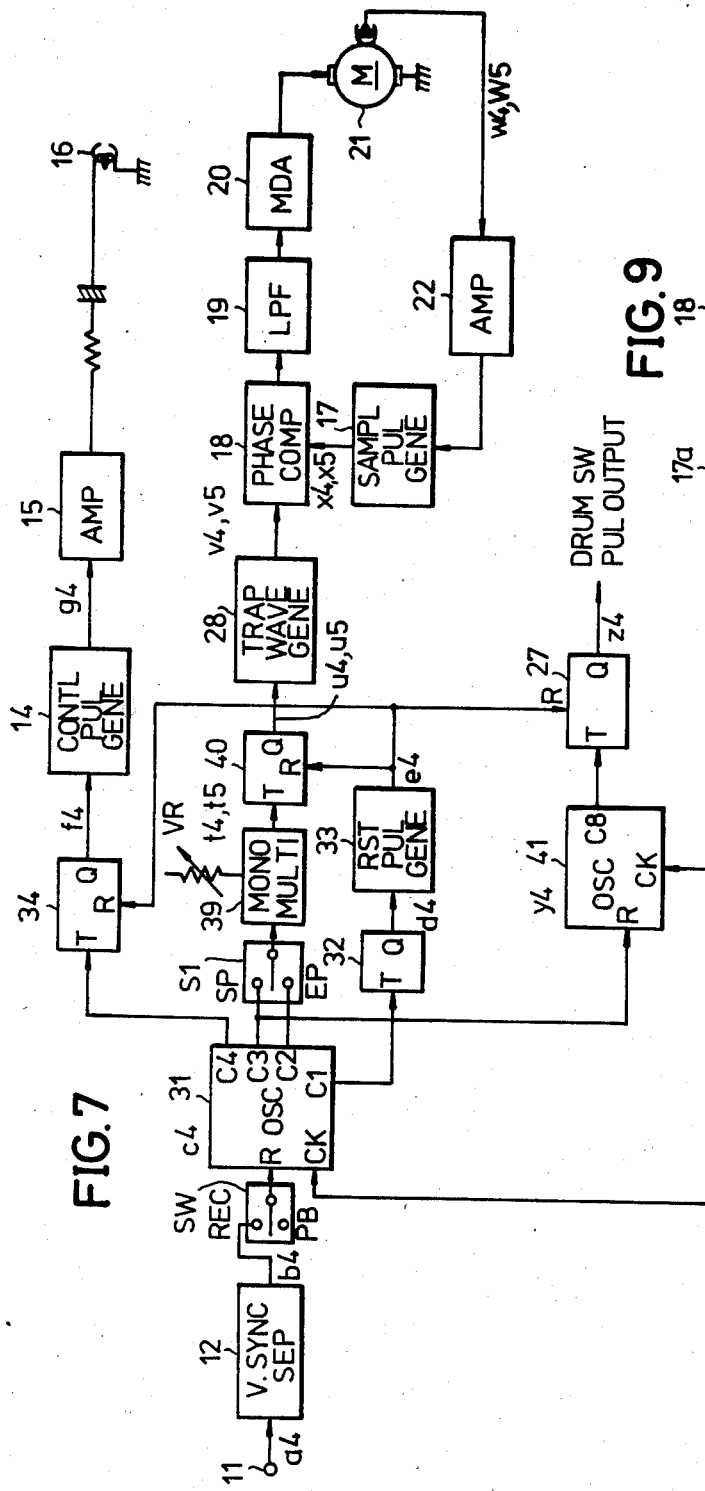
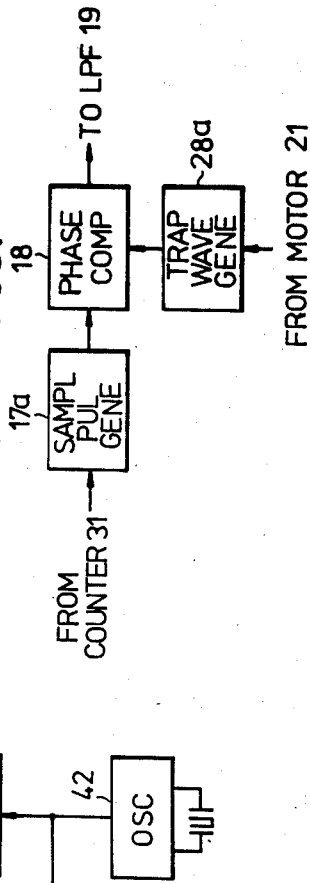
FIG.7
FIG.9

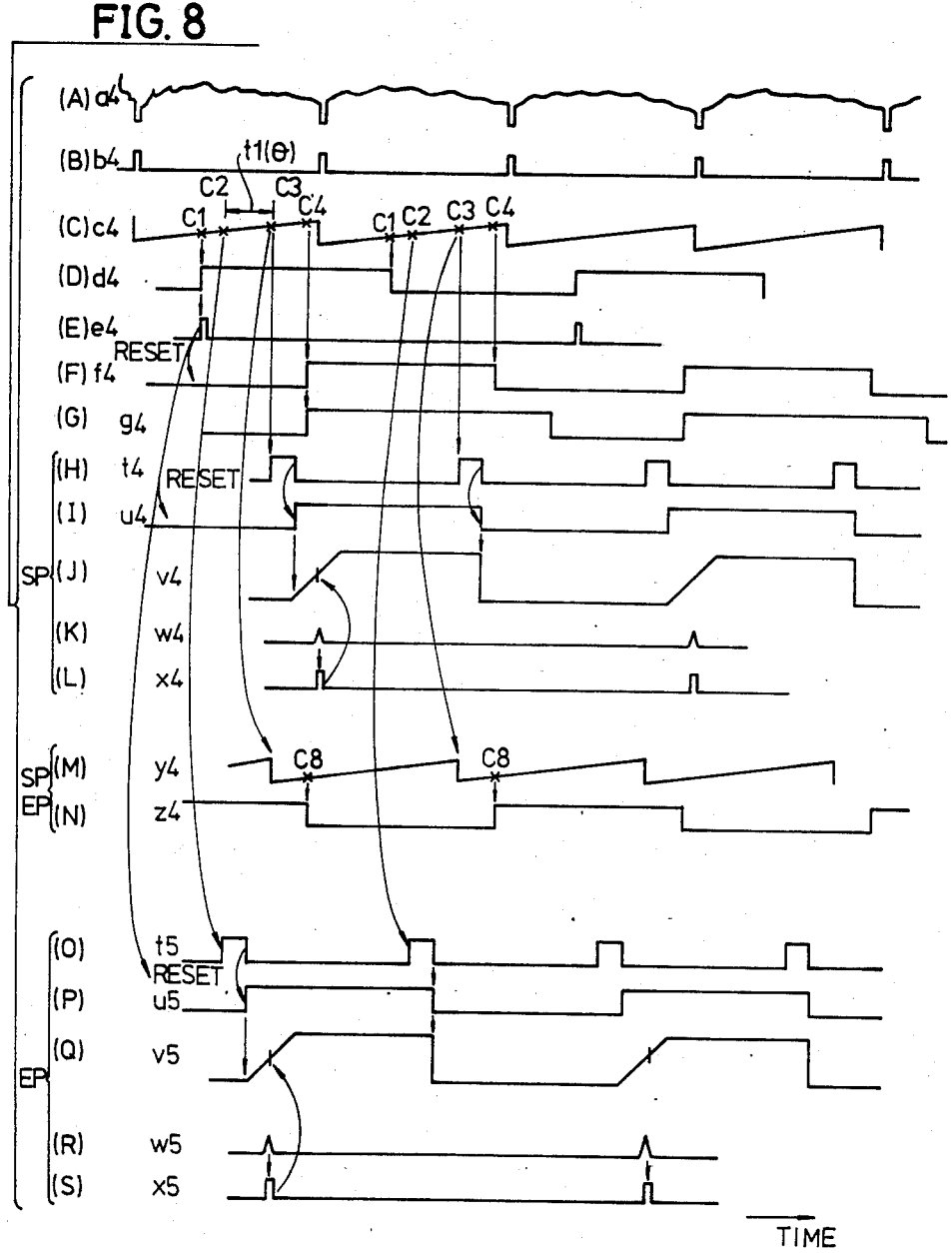

DRUM SERVO CIRCUIT

BACKGROUND OF THE INVENTION

The present invention generally relates to drum servo circuits for a magnetic recording and/or reproducing apparatus, and more particularly to a drum servo circuit which can perform an accurate drum servo operation in a magnetic recording and/or apparatus employing a 4-head double-gap system, for example.

During recording and normal reproduction on the so-called 4-head double-gap system magnetic recording and/or reproducing apparatus, standard play heads SP(1) and SP(2) are used in a standard play mode, and expanded play heads EP(1) and EP(2) are used in an expanded play mode. For example, in the case where a magnetic tape is originally intended to provide two hours of play in the standard play mode, it is possible to obtain six hours of play with this magnetic tape in the expanded play mode. The heads are mounted on a rotary drum at such positions that the head EP(2) leads the head SP(1) by a predetermined angle ($\theta$) in a rotational direction of the rotary drum and the head EP(1) leads the head SP(2) by the predetermined angle ($\theta$) in the rotational direction of the drum.

In such a magnetic recording and/or reproducing apparatus, a rotational phase detection pulse signal is obtained by detecting the rotational phase of the rotary drum. However, there is a phase error $t1(\theta)$ dependent on the predetermined angle ($\theta$) between the rotational phase detection pulse signal obtained in the standard play mode and the rotational phase detection pulse signal obtained in the expanded play mode. Hence, in order to control a drum motor which drives the rotary drum based on sampling pulse signals having identical timings in both the standard and expanded play modes, it is necessary to produce a trapezoidal wave signal for each play mode by changing the time constant of a monostable multivibrator depending on the play mode.

In a conventional drum servo circuit, the time constant of the monostable multivibrator is changed by use of a switch which switches over and connects the monostable multivibrator to an appropriate one of variable resistors depending on the play mode. As a result, the variable resistors which are provided externally to the monostable multivibrator must be used, and it is difficult to produce the drum servo circuit in the form of an integrated circuit because of the external elements. In addition, there is a problem in that the delay introduced in the monostable multivibrator is large in the expanded play mode and causes instability of the drum servo operation.

On the other hand, it is possible to conceive a drum servo circuit in which the time constant of a shaping circuit is changed between the standard and expanded play modes, without the use of the variable resistors connected externally to the monostable multivibrator. According to this conceivable drum servo circuit, it is unnecessary to provide the variable resistors, and furthermore, the delay introduced in the expanded play mode is the same as the delay introduced in the standard play mode and is small. For this reason, it is possible to achieve a stable drum servo operation. However, the delay introduced in the shaping circuit during the expanded play mode is determined by a timing of a rotational speed detection pulse signal which is obtained by detecting the rotational speed of the rotary drum. Therefore, there is a problem in that it is impossible to arbitrarily set the delay time in the shaping circuit.

SUMMARY OF THE INVENTION

Accordingly, it is a general object of the present invention to provide a novel and useful drum servo circuit for a magnetic recording and/or reproducing apparatus, in which the problems described heretofore are eliminated.

Another and more specific object of the present invention is to provide a drum servo circuit for a magnetic recording and/or reproducing apparatus, which does not require a large number of external elements. According to the drum servo circuit of the present invention, it is possible to produce the drum servo circuit in the form of an integrated circuit with ease. Furthermore, it is possible to perform a stable drum servo operation both in the standard and expanded play modes.

Other objects and further features of the present invention will be apparent from the following detailed description when read in conjunction with the accompanying drawings.

BRIEF DESCRIPTION OF THE DRAWINGS

FIGS. 3(A) through 3(Z) show signal waveforms for explaining the operation of the block system shown in FIG. 2;

FIGS. 5(A2) through 5(S3) show signal waveforms for explaining the operation of the block system shown in FIG. 4;

FIG. 7 is a system block diagram showing a second embodiment of the drum servo circuit according to the present invention;

FIGS. 8(A) through 8(S) show signal waveforms for explaining the operation of the block system shown in FIG. 7; and FIG. 9 is a system block diagram showing an essential part of a third embodiment of the drum servo circuit according to the present invention.

DETAILED DESCRIPTION

Figure 1:
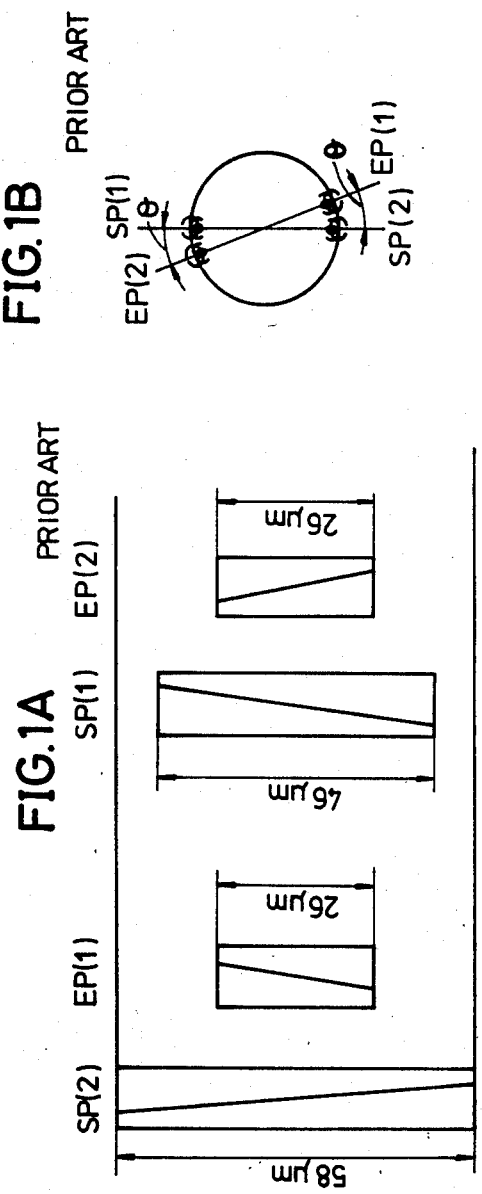
FIGS. 1A and 1B respectively show the arrangement of video heads in the magnetic recording and/or reproducing apparatus.

During recording and normal reproduction on the so-called 4-head double-gap system magnetic recording and/or reproducing apparatus, standard play heads SP(1) and SP(2) are used in a standard play mode, and expanded play heads EP(1) and EP(2) are used in an expanded play mode. For example, in the case where a magnetic tape is originally intended to provide two hours of play in the standard play mode, it is possible to obtain six hours of play with this magnetic tape in the expanded play mode. The heads are mounted on a rotary drum at such positions that the head EP(2) leads the head SP(1) by a predetermined angle ($\theta$) in a rotational direction of the rotary drum (counterclockwise in FIG. 1B) and the head EP(1) leads the head SP(2) by the predetermined angle ($\theta$) in the rotational direction of the drum, as shown in FIGS. 1A and 1B. The mutually opposing heads SP(1) and SP(2) have gaps of mutually different azimuth angles, and the mutually opposing heads EP(1) and EP(2) have gaps of mutually difference azimuth angles.

Figure 2:
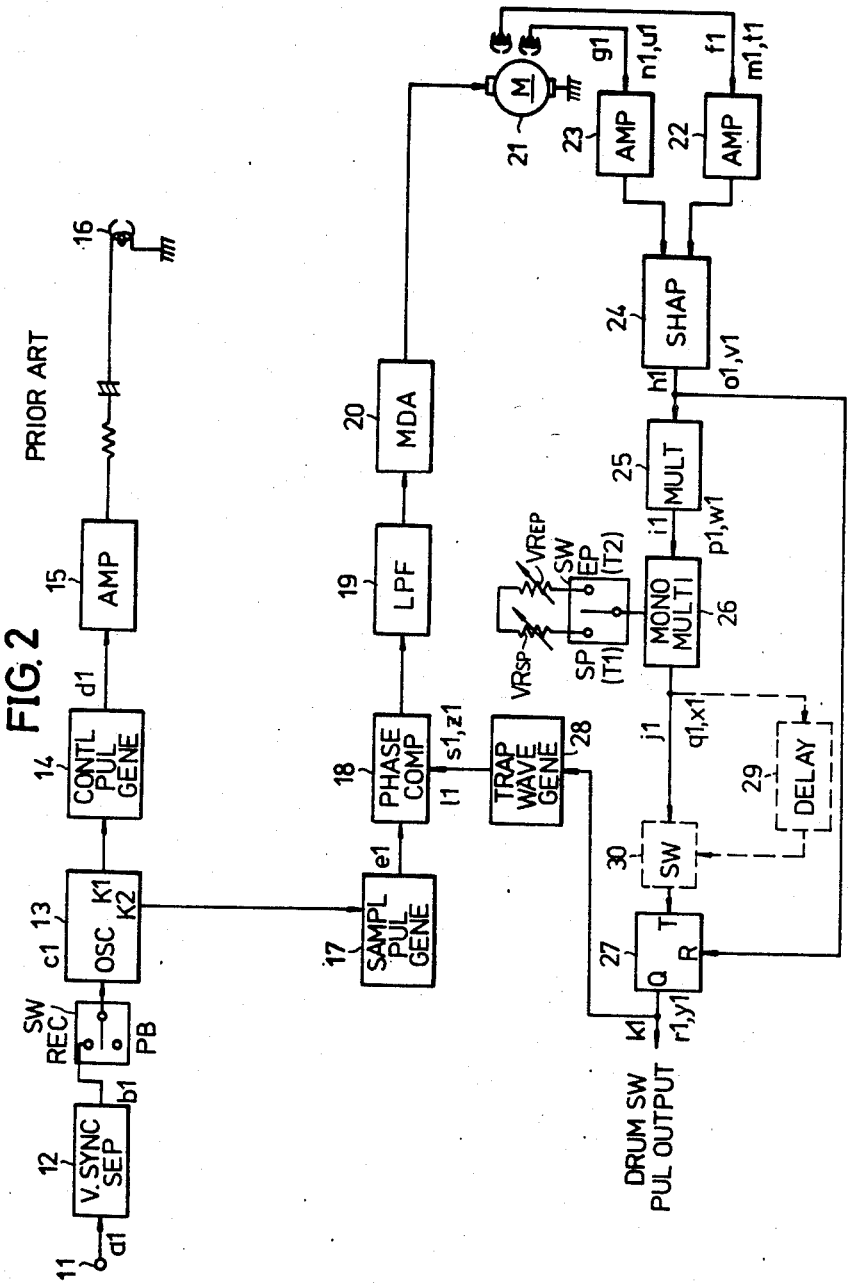
FIG. 2 is a system block diagram showing an example of the conventional drum servo circuit.

FIG. 2 shows the block system of an example of the conventional drum servo circuit. In FIG. 2 and FIGS. 4, 7 and 9 which will be described later on in the specification, switches are connected to respective terminals REC or PB depending on whether the apparatus is set for the recording or normal reproduction (playback), or to respective terminals SP or EP depending on whether the mode of the apparatus is set to the standard play mode or the expanded play mode. In FIG. 2, a video signal a1 shown in FIG. 3(A) is applied to a terminal 11 and is supplied to a vertical synchronizing signal separating circuit 12 wherein a vertical synchronizing signal b1 shown in FIG. 3(B) is separated from the video signal a1. The separated vertical synchronizing signal b1 from the vertical synchronizing signal separating circuit 12 is supplied to an oscillator circuit (counter) 13 which counts clock pulses and is reset by the vertical synchronizing signal b1. The oscillator circuit 13 produces therein a count signal c1 shown in FIG. 3(C). Threshold values K1 and K2 are set in the oscillator circuit 13, and a pulse is produced from terminals K1 and K2 when a counted value of the clock pulses in the oscillator circuit 13 reaches the respective threshold values K1 and K2, where K1 < K2. A control pulse generating circuit 14 generates a control pulse signal d1 shown in FIG. 3(D) from a pulse signal produced from the terminal K1 of the oscillator circuit 13, and this control pulse signal d1 is passed through an amplifier 15 and is recorded on a magnetic tape (not shown) by a control head 16.

On the other hand, a sampling pulse generating circuit 17 generates a sampling pulse signal e1 shown in FIG. 3(E) from a pulse signal produced from the terminal K2 of the oscillator circuit 13, and the sampling pulse signal e1 is supplied to a phase comparator 18. A rotational phase detection pulse signal f1 shown in FIG. 3(F) is produced by a known means which detects the rotational phase of a drum motor 21. The rotational phase detection pulse signal f1 is amplified in an amplifier 22 and is supplied to a shaping circuit 24. A rotational speed detection pulse signal g1 shown in FIG. 3(G) is produced by a known means which detects the rotational speed of the drum motor 21. The rotational speed detection pulse signal g1 is amplified in an amplifier 23 and is supplied to the shaping circuit 24. The shaping circuit 24 produces a signal h1 shown in FIG. 3(H) from the output signals of the amplifiers 22 and 23, and supplies the signal h1 to a multiplier 25 which multiplies the signal h1 by two and produces a signal i1 shown in FIG. 3(I). In the standard play mode, a variable resistor $VR_{SP}$ is connected to a monostable multivibrator 26, and the monostable multivibrator 26 has a time constant T1. Hence, the monostable multivibrator 26 produces a signal j1 shown in FIG. 3(J) in the standard play mode. The signal j1 is formed into a drum switching pulse signal k1 shown in FIG. 3(K) in a flip-flop 27, and a trapezoidal wave generating circuit 28 generates a trapezoidal wave signal j1 shown in FIG. 3(L) from the drum switching pulse signal k1. The trapezoidal wave signal l1 is supplied to the phase comparator 18.

The phase comparator 18 compares the phase of the sampling pulse signal e1 and the phase of the trapezoidal wave signal l1 and produces a phase error signal. This phase error signal is passed through a lowpass filter 19 and is supplied to a motor driving amplifier 20. The motor driving amplifier 20 produces a driving signal which is used to drive and control the drum motor 21.

On the other hand, in the expanded play mode, a rotational phase detection pulse signal m1 shown in FIG. 3(M) is obtained and is supplied to the amplifier 22. There is a phase error $t1(\theta)$ between this rotational phase detection pulse signal m1 and the rotational phase detection pulse signal f1 obtained in the standard play mode. This phase error $t1(\theta)$ is dependent on the predetermined angle $(\theta)$ between the mounting positions of the heads EP(2) and SP(1) (or EP(1) and SP(2)). In addition, a rotational speed detection pulse signal n1 shown in FIG. 3(N) is supplied to the amplifier 23 in the expanded play mode. Consequently, the shaping circuit 24 produces a signal o1 shown in FIG. 3(0), and the multiplier 25 produces a signal p1 shown in FIG. 3(P). In the expanded play mode, a variable resistor $VR_{EP}$ is connected to the monostable multivibrator 26, and the monostable multivibrator 26 has a time constant T2. Hence, a signal q1 shown in FIG. 3(Q) is supplied to the flip-flop 27 from the monostable multivibrator 26, and the flip-flop 27 produces a drum switching pulse signal r1 shown in FIG. 3(R). The trapezoidal wave generating circuit 28 generates a trapezoidal wave signal s1 shown in FIG. 3(S) from the drum switching pulse signal r1.

However, according to the conventional circuit shown in FIG. 2, the time constant of the monostable multivibrator 26 must be changed by controlling the switch which connects either the variable resistor $VR_{SP}$ or $VR_{EP}$ to the monostable multivibrator 26 depending on the play mode. Because the variable resistors $VR_{SP}$ and $VR_{EP}$ must be provided externally to the monostable multivibrator 26, the conventional circuit is unsuited for production in the form of an integrated circuit. Furthermore, because the delay time in the monostable multivibrator 26 is large in the expanded play mode, there is a problem in that the drum servo operation becomes unstable.

Accordingly, it is possible to conceive a drum servo circuit which does not require the provision of the variable resistors $VR_{SP}$ and $VR_{EP}$, by fixing the time constant of the monostable multivibrator 26 to T1. In this conceivable drum servo circuit, a delay circuit 29 and a switch 30 are provided as indicated by phantom lines in FIG. 2. The delay circuit 29 has a delay time $t1(\theta) = T2 - T1$. The switch 30 supplies the output signal of the monostable multivibrator 26 as it is to the flip-flop 27 in the standard play mode, and supplies an output delayed signal of the delay circuit 29 to the flip-flop 27 in the expanded play mode. However, the delay time in the delay circuit 29 is large, and the drum servo operation is unstable especially in the expanded play mode.

It is possible to conceive another drum servo circuit which does not require the provision of the variable resistors $VR_{SP}$ and $VR_{EP}$, by fixing the time constant of the monostable multivibrator 26 to T1 and changing the time constant of the shaping circuit 24 depending on the play mode. The operation of this conceivable drum servo circuit in the standard play mode is essentially the same as that of the conceivable drum servo circuit mentioned before. On the other hand, in the expanded play mode, a rotational phase detection pulse signal t1 shown in FIG. 3(T) and a rotational speed detection pulse signal u1 shown in FIG. 3(U) are supplied to the shaping circuit 24 via the respective amplifiers 22 and 23. In this case, the shaping circuit 24 produces a signal v1 shown in FIG. 3(V) in synchronism with the second pulse of the rotational speed detection pulse signal u1. The signal v1 is formed into a signal w1 shown in FIG. 3(W) in the multiplier 25. The monostable multivibrator 26 forms the signal w1 into a signal x1 shown in FIG. 3(X), and the flip-flop 27 produces a drum switching pulse signal y1 shown in FIG. 3(Y) from the signal x1. The trapezoidal wave generating circuit 28 generates a trapezoidal wave signal z1 shown in FIG. 3(Z) from the drum switching pulse signal y1.

According to the latter conceivable drum servo circuit, it is unnecessary to provide the variable resistors $VR_{SP}$ and $VR_{EP}$ which are coupled externally to the monostable multivibrator 26. In addition, it is possible to perform a stable drum servo operation because the delay introduced in the expanded play mode is the same as the delay introduced in the standard play mode and is small. However, the delay time of the shaping circuit 24 in the expanded play mode is determined by the timing of the rotational speed detection pulse signal u1, and there is a problem in that this delay time cannot be set arbitrarily.

Figure 4:
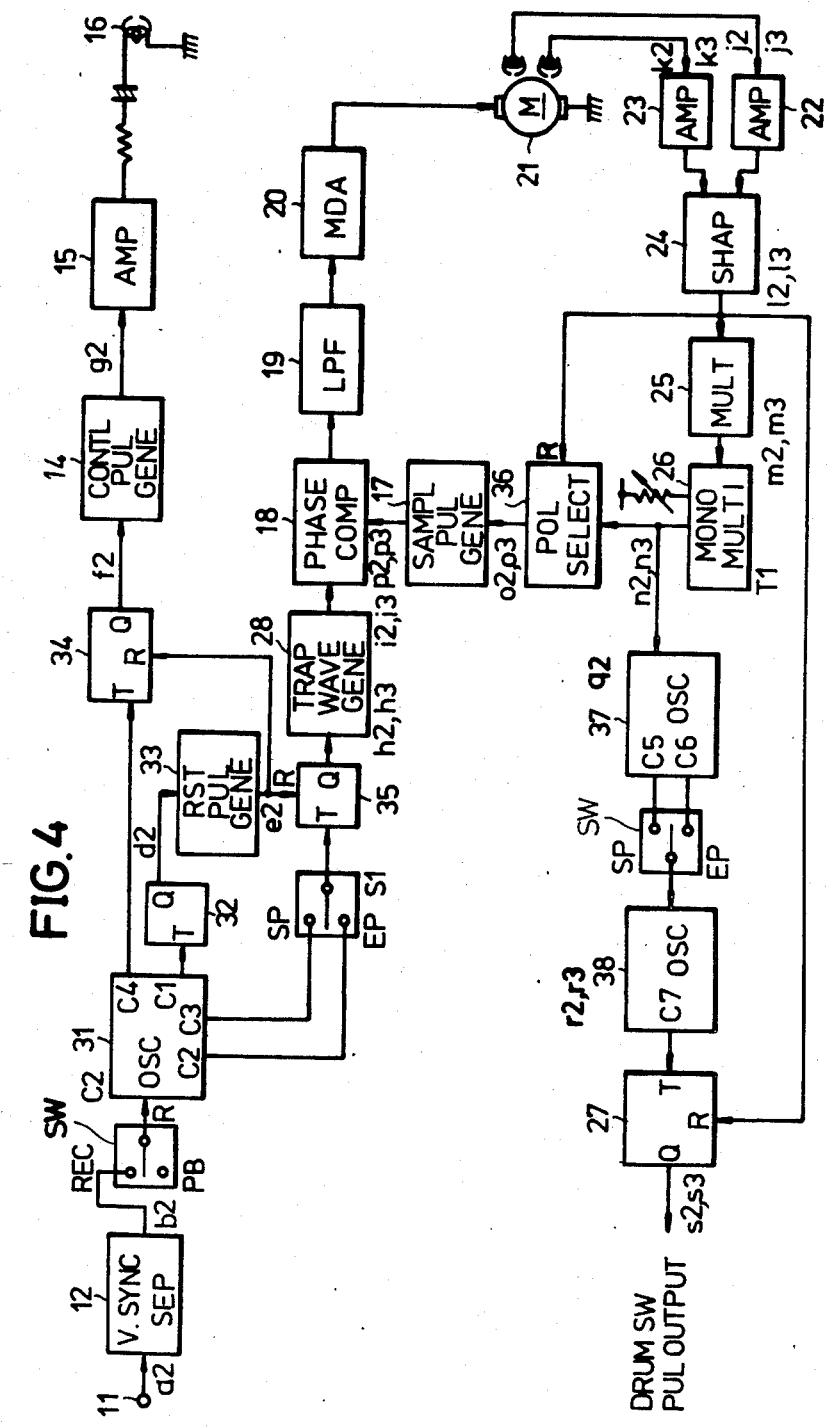
FIG. 4 is a system block diagram showing a first embodiment of the drum servo circuit according to the present invention.

FIG. 4 shows the block system of a first embodiment of the drum servo circuit according to the present invention. In FIG. 4, those parts which are the same as those corresponding parts in FIG. 2 are designated by the same reference numerals, and description thereof will be omitted. In FIG. 4, a vertical synchronizing signal b2 shown in FIG. 5(B2) is separated from a video signal a2 shown in FIG. 5(A2) in the vertical synchronizing signal separating circuit 12. The signals a2 and b2 are identical to the signals a1 and b1 described before, respectively. A count signal c2 shown in FIG. 5(C2) is produced within a 60 Hz oscillator circuit (counter) 31 which counts clock pulses and is reset by the vertical synchronizing signal b2. Threshold values C1, C2, C3 and C4 are set in the oscillator circuit 31, and a pulse is produced from terminals C1, C2, C3 and C4 when a counted value of the clock pulses in the oscillator circuit 31 reaches the respective threshold values C1, C2, C3 and C4, where $C1 < C2 < C3 < C4$ and the difference between C2 and C3 is $t1(\theta)$. When the counted value in the oscillator circuit 31 reaches the threshold value C1, a flip-flop 32 produces a signal d2 shown in FIG. 5(D2) from a pulse signal produced from the terminal C1. A reset pulse generating circuit 33 generates a reset pulse signal e2 shown in FIG. 5(E2) from the signal d2. When the counted value in the oscillator circuit 31 reaches the threshold value C4, a flip-flop 34 produces a signal f2 shown in FIG. 5(F2) from a pulse signal produced from the terminal C4. The control pulse generating circuit 14 generates a control pulse signal g2 shown in FIG. 5(G2) from the signal f2.

Figure 6:
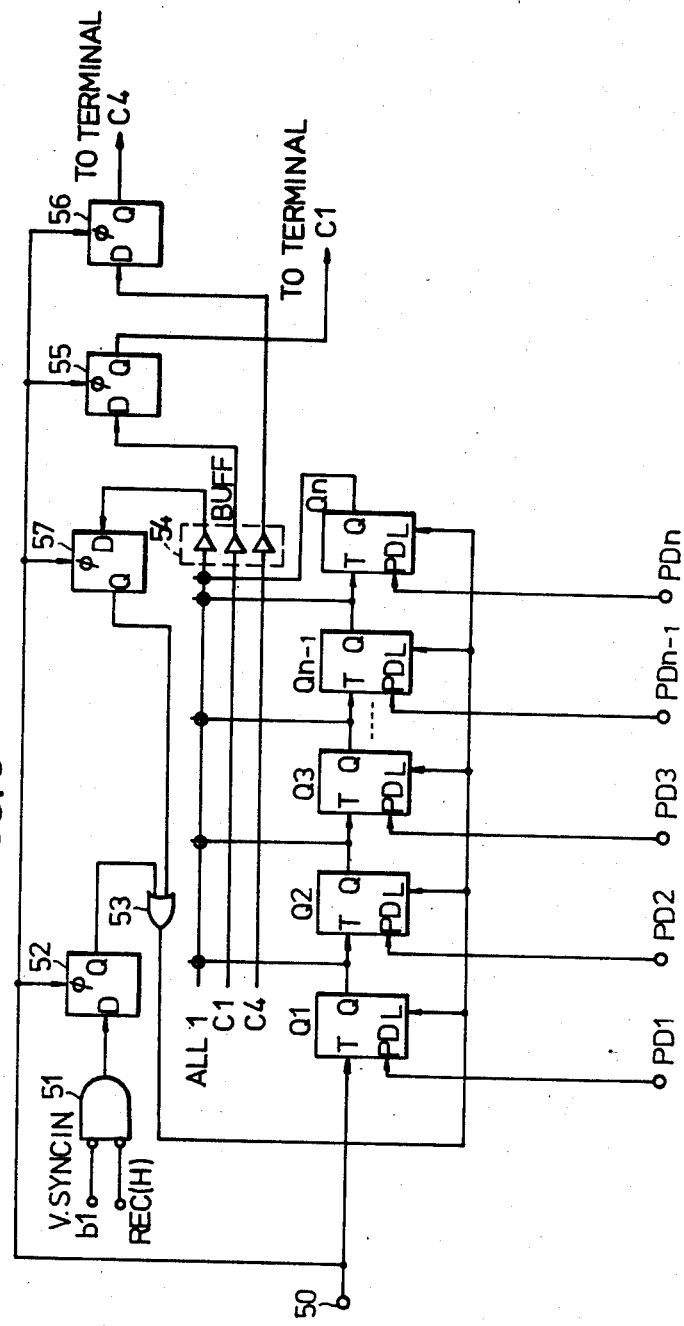
FIG. 6 is a circuit diagram showing the general construction of an oscillator circuit.

FIG. 6 shows the general construction of an example of the oscillator circuit (counter) having threshold values set therein. The construction of this oscillator circuit is known. For convenience' sake, it will be assumed that the oscillator circuit is set with two threshold values C1 and C2 as in the case of the oscillator circuit 13 described before. In FIG. 6, a clock signal is applied to an input terminal 50 and is supplied to a counter constituted by n flip-flops Q1 through Qn. The separated vertical synchronizing signal (b1) is applied to one input terminal of a gate circuit 51, and a pulse signal REC(H) which has a high level during the recording is applied to another input terminal of the gate circuit 51. An output signal of the gate circuit 51 is passed through a delay flip-flop 52 and an OR gate 53, and is supplied to load terminals L of the flip-flops Q1 through Qn. In addition, n-bit preset data are applied to preset data terminals PD of the flip-flops Q1 through Qn from terminals PD1 through PDn and are loaded therein.

Output signals of the flip-flops Q1 through Qn are passed through a buffer 54 constituted by AND gates, and output signals of the buffer 54 are supplied to flip-flops 55 and 56 which respectively produce signals in accordance with the timings with which the threshold values C1 and C2 are reached. When all of the outputs of the flip-flops Q1 through Qn are high, a signal from the buffer 54 is passed through a flip-flop 57 and the OR gate 53 and is applied to the load terminals L of the flip-flops Q1 through Qn. The oscillator circuit 31 has a similar construction except that four threshold values are set therein as compared to two in FIG. 6.

In FIG. 4, a switch S1 is connected to a terminal SP in the standard play mode and to a terminal EP in the expanded play mode. In the standard play mode, a pulse signal is supplied to a flip-flop 35 from the terminal C3 of the oscillator circuit 31 when the counted value therein reaches the threshold value C3, and the flip-flop 35 produces a signal h2 shown in FIG. 5(H2). The trapezoidal wave generating circuit 28 generates a trapezoidal wave signal i2 shown in FIG. 5(I2) from the signal h2. A rotational phase detection pulse signal j2 shown in FIG. 5(J2) and a rotational speed detection pulse signal k2 shown in FIG. 5(K2) are supplied to the shaping circuit 24 via the respective amplifiers 22 and 23. Hence, the shaping circuit 24 produces a signal l2 shown in FIG. 5(L2) and the multiplier 25 produces a signal m2 shown in FIG. 5(M2). The signal m2 is supplied to the monostable multivibrator 26 having the time constant T1 and is formed into a signal n2 shown in FIG. 5(N2). This signal n2 is formed into a signal o2 shown in FIG. 5(O2) in a polarity selecting circuit 36, and the sampling pulse generating circuit 17 generates a sampling pulse signal p2 shown in FIG. 5(P2) from the signal o2.

The output signal n2 of the monostable multivibrator 26 resets a 60 Hz oscillator circuit (counter) 37 which counts clock pulses and produces therein a count signal q2 shown in FIG. 5(Q2). Threshold values C5 and C6 are set in the oscillator circuit 37, where $C5 < C6$ and the difference between the threshold values C5 and C6 is equal to $t1(\theta)$. A pulse signal produced from a terminal C5 of the oscillator circuit 37 resets a 60 Hz oscillator circuit (counter) 38 which counts clock pulses and produces therein a count signal r2 shown in FIG. 5(R2). A threshold value C7 is set in the oscillator circuit 38. A pulse signal produced from a terminal C7 of the oscillator circuit 38 is supplied to the flip-flop 27, and a drum switching pulse signal s2 shown in FIG. 5(S2) is produced from the flip-flop 27.

On the other hand, in the expanded play mode, a pulse signal is supplied to the flip-flop 35 from the terminal C2 of the oscillator circuit 31 when the counted value therein reaches the threshold value C2, and the flip-flop 35 produces a signal h3 shown in FIG. 5(H3). The trapezoidal wave generating circuit 28 generates a trapezoidal wave signal i3 shown in FIG. 5(I3) from the signal h3. A rotational phase detection pulse signal j3 shown in FIG. 5(J3) and a rotational speed detection pulse signal k3 shown in FIG. 5(K3) are supplied to the shaping circuit 24 via the respective amplifiers 22 and 23. Hence, the shaping circuit 24 produces a signal l3 shown in FIG. 5(L3) and the multiplier 25 produces a signal m3 shown in FIG. 5(M3). The signal m3 is supplied to the monostable multivibrator 26 having the time constant T1 and is formed into a signal n3 shown in FIG. 5(N3). This signal n3 is formed into a signal o3 shown in FIG. 5(O3) in the polarity selecting circuit 36, and the sampling pulse generating circuit 17 generates a sampling pulse signal p3 shown in FIG. 5(P3) from the signal o3.

The output signal n3 of the monostable multivibrator 26 also resets the oscillator circuit 37 which counts the clock pulses and produces therein a count signal q3 shown in FIG. 5(Q3). A pulse signal produced from a terminal C6 of the oscillator circuit 37 resets the oscillator circuit 38 which counts the clock pulses and produces therein a count signal r3 shown in FIG. 5(R3). A pulse signal produced from the terminal C7 of the oscillator circuit 38 is supplied to the flip-flop 27, and a drum switching pulse signal s3 shown in FIG. 5(S3) is produced from the flip-flop 27.

According to the present embodiment, the 60 Hz oscillator circuit 31 is provided and the pulse signals produced from the terminals C2 and C3 thereof are selectively used depending on the play mode so as to obtain the trapezoidal wave signals i2 and i3. Hence, it is unnecessary to externally couple a plurality of variable resistors to the monostable multivibrator 26 as is required in the conventional drum servo circuit, and it is therefore unnecessary to change the time constant of the monostable multivibrator 26 between the time constants T1 and T2 depending on the play mode. As a result, the drum servo circuit is suited for production in the form of an integrated circuit. Furthermore, it is possible to perform a stable drum servo operation because the delay time in the monostable multivibrator 26 is small. In addition, the timing difference between the drum switching pulse signals in the standard and expanded play modes may be set arbitrarily by setting the threshold values C2 and C3 of the oscillator circuit 31 to appropriate values. In other words, the angle ($\theta$) between the mounting positions of the heads SP(1) and EP(2) (or SP(2) and EP(1)) may be set arbitrarily.

FIG. 7 shows the block system of a second embodiment of the drum servo circuit according to the present invention. In FIG. 7, those parts which are the same as those corresponding parts in FIGS. 2 and 4 are designated by the same reference numerals, and description thereof will be omitted. A video signal a4 and a vertical synchronizing signal b4 shown in FIGS. 8(A) and 8(B) are identical to the video signal a1 and the vertical synchronizing signal b1 described before, respectively. FIGS. 8(C) through 8(G) respectively show a signal c4 produced within the oscillator circuit 31, an output signal of the flip-flop 32, and output reset pulse signal e4 of the reset pulse generating circuit 33, an output signal f4 of the flip-flop 34, and an output control pulse signal g4 of the control pulse generating circuit 14.

In the standard play mode, a monostable multivibrator 39 produces a signal t4 shown in FIG. 8(H) from the pulse signal produced from the terminal C3 of the oscillator circuit 31. A flip-flop 40 produces a signal u4 shown in FIG. 8(I) from the signal t4, and the trapezoidal wave generating circuit 28 produces a trapezoidal wave signal v4 shown in FIG. 8(J) from the signal u4. A variable resistor VR is coupled to the monostable multivibrator 39 for adjusting an error in the mounting position of the means (for example, magnetic head) which detects the rotational phase of the drum motor 21. A rotational phase detection pulse signal w4 shown in FIG. 8(K) is supplied to the sampling pulse generating circuit 17 via the amplifier 22, and the sampling pulse generating circuit 17 generates a sampling pulse signal x4 shown in FIG. 8(L).

On the other hand, in the expanded play mode, the monostable multivibrator 39 produces a signal t5 shown in FIG. 8(O) from the pulse signal produced from the terminal C2 of the oscillator circuit 31. The flip-flop 40 produces a signal u5 shown in FIG. 8(P) from the signal t5, and the trapezoidal wave generating circuit 28 produces a trapezoidal wave signal v5 shown in FIG. 8(Q) from the signal u5. A rotational phase detection pulse signal w5 shown in FIG. 8(R) is supplied to the sampling pulse generating circuit 17 via the amplifier 22, and the sampling pulse generating circuit 17 generates a sampling pulse signal x5 shown in FIG. 8(S).

An oscillator circuit (counter) 41 counts clock pulses generated from a crystal oscillator 42 which supplies the clock pulses also to the oscillator circuit 31 to be counted therein. The oscillator circuit 41 has a threshold value C8 set therein and is reset by the pulse signal produced from the terminal C3 of the oscillator circuit 31. Hence, a count signal y4 shown in FIG. 8(M) is produced within the oscillator circuit 41. A pulse signal produced from a terminal C8 of the oscillator circuit 41 is formed into a drum switching pulse signal z4 shown in FIG. 8(N) in the flip-flop 27.

In the first and second embodiments, it is possible to use a 30 Hz oscillator circuit for the oscillator circuit 31, and set therein a total of eight threshold values corresponding to the four threshold values C1 through C4 in the first field and the four threshold values C1 through C4 in the next field in FIG. 5(C2), so that eight pulse signals are produced from respective terminals in accordance with the timings with which the counted value reaches the eight threshold values.

FIG. 9 shows the block system of an essential part of a third embodiment of the drum servo circuit according to the present invention. In FIG. 9, those parts which are the same as those corresponding parts in FIGS. 4 and 7 are designated by the same reference numerals, and description thereof will be omitted. In FIG. 9, a sampling pulse generating circuit 17a generates sampling pulse signals responsive to the pulse signals produced from the respective terminals of the oscillator circuit (counter) 31. On the other hand, a trapezoidal wave generating circuit 28a generates a trapezoidal wave signal from a rotational phase detection pulse signal which is obtained by detecting the rotational phase of the drum motor 21. The phase comparator 18 compares the phase of the output sampling pulse signal of the sampling pulse generating circuit 17a and the phase of the output trapezoidal wave signal of the trapezoidal wave generating circuit 28a, and supplies a phase error signal to the lowpass filter 19.

The drum servo circuit according to the present invention can also be applied to a magnetic recording and/or reproducing apparatus which performs the recording and reproduction by use of a first pair of video heads and performs a slow motion reproduction, still reproduction and search reproduction by use of a second pair of video heads.

According to the drum servo circuit of the present invention, a 30 Hz or 60 Hz oscillator circuit (counter) is provided, and a trapezoidal wave signal (or a sampling pulse signal) is produced by selectively using threshold values set in the oscillator circuit depending on the play mode. Hence, it is unnecessary to externally couple a plurality of variable resistors to the monostable multivibrator as is required in the conventional drum servo circuit, and it is therefore unnecessary to change the time constant of the monostable multivibrator depending on the play mode. As a result, the drum servo circuit is suited for production in the form of an integrated circuit. In addition, it is possible to perform a stable drum servo operation in both the standard and expanded play modes. Moreover, the timing difference between the drum switching pulse signals in the standard and expanded play modes may be set arbitrarily by setting the threshold values of the oscillator circuit to appropriate values. In other words, the angle ($\theta$) between the mounting positions of the heads SP(1) and EP(2) (or SP(2) and EP(1)) may be set arbitrarily.

Further, the present invention is not limited to these embodiments, but various variations and modifications may be made without departing from the scope of the present invention.

What is claimed is:

1. A drum servo circuit for a magnetic recording and/or reproducing apparatus which records and/or reproduces a video signal on and/or from a magnetic tape by use of video heads mounted on a rotary body which is driven by a motor, said rotary body being mounted with first and second pairs of video heads one pair of which is selectively used depening on a play mode of the magnetic recording and/or reproducing apparatus, said first and second pairs of video heads being mounted on said rotary body at such positions that said first pair of video heads lags said second pair of video heads by a predetermined angle in a rotational direction of said rotary body, said first pair of video heads being used in a first play mode, said second pair of video heads being used in a second play mode, said drum servo circuit comprising:

counter means reset by a vertical synchronizing signal of the video signal for counting clock pulses and producing a pulse signal having a predetermined frequency at the time of a recording, said counter means running free at an oscillation frequency equal to said predetermined frequency at the time of a reproduction;

first circuit means for producing a first signal when a counted value in said counter means reaches a first threshold value in said first play mode, and for producing a second signal in said second play mode when the counted value in said counter means reaches a second threshold value after a predetermined time from a time when said first threshold value is reached, said predetermined time being in correspondence with said predetermined angle;

rotation detecting means for producing a rotation detection signal by detecting a rotation of said rotary body;

second circuit means for producing a third signal from said rotation detection means;

third circuit means for producing a phase error signal by comparing the phase of said first signal and the phase of said third signal in said first play mode and by comparing the phase of said second signal and the phase of said third signal in said second play mode; and driving circuit means for driving said motor responsive to said phase error signal.

2. A drum servo circuit as claimed in claim 1 in which said predetermined frequency is equal to 60 Hz.

3. A drum servo circuit as claimed in claim 1 in which said predetermined frequency is equal to 30 Hz.

4. A drum servo circuit as claimed in claim 1 in which said first play mode is a standard play mode and said second play mode is an expanded play mode, said expanded play mode providing a longer play time compared to that of said standard play mode for a given length of magnetic tape.

5. A drum servo circuit as claimed in claim 1 in which said first circuit means produces first and second trapezoidal wave signals as said first and second signals, and said second circuit means produces a sampling pulse signal as said third signal.

6. A drum servo circuit as claimed in claim 5 in which said first circuit means comprises a circuit for producing a pulse signal of 30 Hz when the counted value in said counter means reaches said first or second threshold value, and a circuit for producing said first and second signals responsive to edges of said pulse signal.

7. A drum servo circuit as claimed in claim 5 in which said first circuit means comprises a circuit for producing a first pulse signal of 60 Hz when the counted value in said counter means reaches said first or second threshold value, a circuit for producing a second pulse signal of 30 Hz from said first pulse signal, and a circuit for producing said first and second trapezoidal wave signals responsive to edges of said second pulse signal.

8. A drum servo circuit as claimed in claim 5 in which said rotation detecting means comprises means for producing a rotational phase detection pulse signal by detecting a rotational phase of said motor, and said second circuit means comprises a circuit for producing a pulse signal of 60 Hz from said rotational phase detection pulse signal and a circuit for delaying said pulse signal by a predetermined delay time so as to produce said sampling pulse signal, said sampling pulse signal having a frequency of 30 Hz.

9. A drum servo circuit as claimed in claim 1 in which said first circuit means produces first and second sampling pulse signals as said first and second signals, and said second circuit means produces a trapezoidal wave signal as said third signal.

* * * * *